(12) United States Patent
Grankäll et al.

(10) Patent No.: US 7,758,793 B2
(45) Date of Patent: Jul. 20, 2010

(54) METHOD AND APPARATUS FOR MANUFACTURING OF AN ARTICLE INCLUDING AN EMPTY SPACE

(75) Inventors: Tommy Grankäll, Linköping (SE); Mikael Petersson, Linköping (SE); Per Hallander, Linköping (SE); Jan-erik Lindbäck, Linköping (SE); Bjorn Weidmann, Borensberg (SE); Jan Andersson, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 12/330,185

(22) Filed: Dec. 8, 2008

(65) Prior Publication Data
US 2009/0152775 A1 Jun. 18, 2009

(30) Foreign Application Priority Data
Dec. 6, 2007 (EP) .................................. 07122527

(51) Int. Cl.
*B29C 33/54* (2006.01)
*B29C 33/46* (2006.01)
*B29C 33/50* (2006.01)

(52) U.S. Cl. .................. 264/313; 264/221; 264/225; 264/317; 264/DIG. 44; 425/436 RM; 425/438; 425/440; 249/61; 249/183

(58) Field of Classification Search .......... 425/436 RM, 425/DIG. 44, 440, 438; 249/61, 142, 183; 264/221, 225, 313, 317, DIG. 44

See application file for complete search history.

(56) References Cited

U.S. PATENT DOCUMENTS

| | | | | | |
|---|---|---|---|---|---|
| 2,517,902 | A | * | 8/1950 | Luebkeman | ................. 264/221 |
| 4,424,183 | A | * | 1/1984 | Nelson | ........................ 264/221 |
| 5,262,121 | A | * | 11/1993 | Goodno | ...................... 264/571 |

FOREIGN PATENT DOCUMENTS

| | | |
|---|---|---|
| FR | 2898539 A1 | 9/2007 |
| GB | 2284173 A | 5/1995 |
| JP | 8-142060 * | 6/1996 |
| WO | WO-03/064130 A1 | 8/2003 |
| WO | WO-2005/105402 A1 | 11/2005 |
| WO | WO-2007/107552 A1 | 9/2007 |
| WO | WO-2007/107553 A1 | 9/2007 |

OTHER PUBLICATIONS

European Search Report—May 13, 2008.

* cited by examiner

*Primary Examiner*—Joseph S Del Sole
*Assistant Examiner*—Robert Dye
(74) *Attorney, Agent, or Firm*—Venable LLP; Eric J. Franklin

(57) ABSTRACT

A tool assembly including a male tool including an inner shape tool including a bag having a connection connectable to a depressurization source for providing a vacuum in the bag such that beads therein form a body of firm cohesion providing the inner shape tool rigid. The male tool further includes a flexible, hollow curing support arranged around the rigid inner shape tool, the inner shape tool is arranged to be removable from the flexible, hollow curing support by rupturing the vacuum.

9 Claims, 3 Drawing Sheets

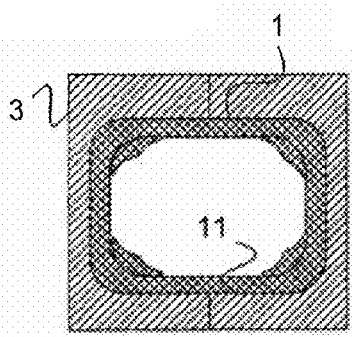
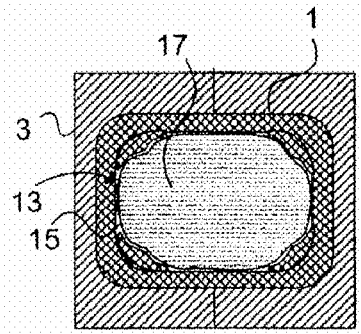
FIG. 1a                FIG. 1b
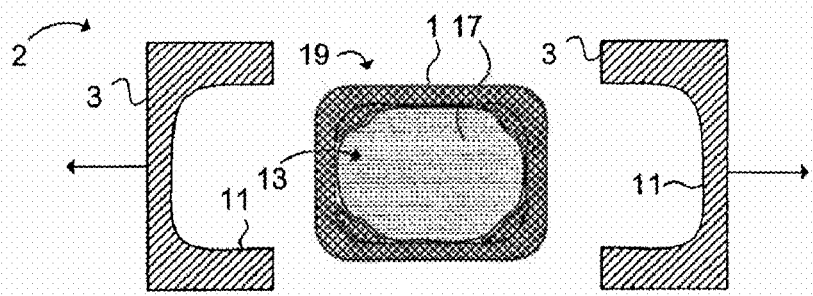
FIG. 1c
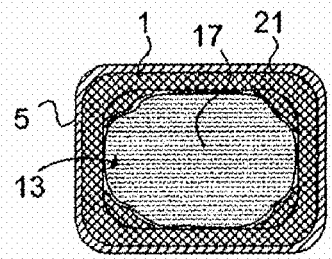 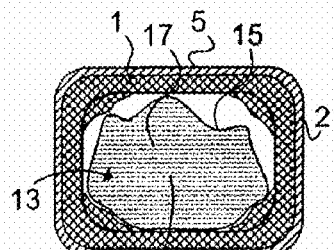 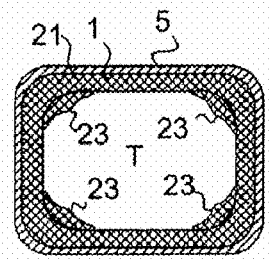
FIG. 1d                FIG. 1e                FIG. 1f
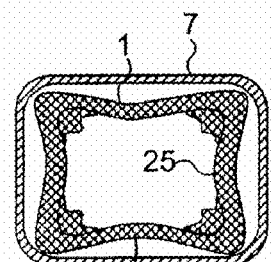     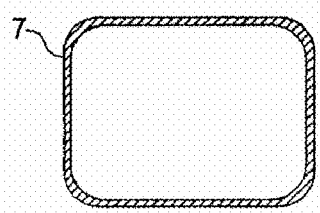
FIG. 1g                              FIG. 1h
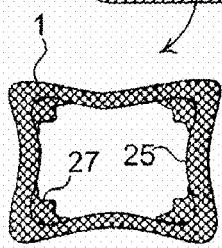     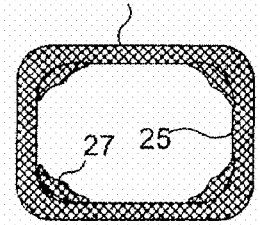
FIG. 1i

A-A

METHOD AND APPARATUS FOR MANUFACTURING OF AN ARTICLE INCLUDING AN EMPTY SPACE

CROSS-REFERENCE TO RELATED APPLICATIONS

This application claims priority to European patent application 07122527.6 filed 6 Dec. 2007.

TECHNICAL FIELD OF THE INVENTION

The present invention relates to a tool assembly, and to a method. The present invention relates, but not limited, to aircraft industry.

BACKGROUND OF THE INVENTION

Methods for manufacture of composite articles having an empty space, wherein the empty space's cross section measure is greater than any open part's cross section of the article for withdrawal of an inner male tool, are known. That is, the use of a lost core mould or a collapsible male tool body, for forming such empty space, is well known within the art. Lost core moulding methods are also used for making curved hollow beams where withdrawal of a rigid male tool from the empty space is impossible without breaking the final article.

Rigid interior mould inserts are used in the form of several connectable units for removing the mould inserts from the final article. The complexity of connecting these units together, and the occupied interior of the blank material during the curing procedure, will imply an expensive production performance.

WO 03/064130 discloses a mould insert produced of a particulate material in a gas-tight bag giving the mould insert the desired exterior shape while the bag is vacuum sealed such that the particulate material forms a body of firm cohesion. The composite material, such as prepreg material, is formed around the mould insert and after the curing of the composite material the gas tight bag is punctured, whereupon the cohesion of the mould insert collapses when the vacuum is ruptured. The particulate material is removed together with the bag material from the final article.

Also GB 2284173 discloses an inner core tool for a lost core moulding process. The inner core tool is made by a bag with particles which will rigidify when evacuating air from the bag interior. The inner core tool is inserted in a rigid mould establishing a pressurisible plenum volume conforming the form of the finished article. A polymerisable material is introduced into said volume.

The inner core tool is removed after polymerization of the article.

However, there still exists a problem how to reduce the production time for producing hollow articles, e.g made of plastic, using a vacuum sealed bag with particulate material as a collapsible inner shape tool or core tool. Also, there is a need of controlling the curing cycle of the article to be produced.

The object of the present invention is to overcome the drawbacks of known methods and achieve further development of the method disclosed in WO 03/064130, which document however discloses a well working method.

SUMMARY OF THE INVENTION

This has been solved by a tool assembly being defined in the introduction.

In such way a tool (the flexible, hollow curing support) is achieved which can be used in the production of an hollow plastic article having openings, through which the tool can be removed and re-used, with an exit area smaller than the cross-sectional area of the tool. The flexible, hollow curing support is so flexible that it can be collapsed for removal from the article, but enough stiff to serve as a support for the blank material during the curing process. By the tool is achieved that the curing time will be less than the case with prior art techniques, since heated air can be fed into the interior of the tool. This heated air will warm up the tool from inside and thereby also the blank will be warmed up from inside, which is beneficial for the curing process. Also, the cooling time after curing can be speeded up since cold air can be fed into the interior of the tool. The curing time will thus be controllable in a more efficient way compared with known techniques. The production time will be less, which is cost effective.

Suitably, a sealing means is arranged for sealing the interior of the flexible, hollow curing support.

Thereby a distinct collapse of the flexible, hollow curing support can be achieved by means of vacuum. The sealing means comprises preferably connections for easily connection to a vacuum source. The sealing means can be permanently arranged on the flexible, hollow curing support and can comprise ducts for warm air useful for the curing process.

Preferably, the flexible, hollow curing support comprises internal reinforcement element.

In such way the flexible, hollow curing support can be arranged and modulated for supporting certain critical areas, such as corners or other curvatures with small radius, of the blank material during the curing process.

Suitably, the tool assembly further comprises a close tolerance dividable outer shape tool for forming the male tool.

Thereby the tolerance ranges for the flexible, hollow curing support can be held close by using the close tolerance dividable outer shape tool for forming the male tool and thus the flexible, hollow curing support. By means of the flexible properties of the flexible, hollow curing support, the blank forming surface of the latter will always lie close to the forming wall of the dividable outer shape tool when preparing the male tool by means of the inner shape tool. The flexible, hollow curing support will thus due to the tool assembly achieve a high tolerance in form.

Preferably, the close tolerance dividable outer shape tool comprises a through bore connectable to a depressurization source for seating the flexible, hollow curing support against a forming wall of the close tolerance dividable outer shape tool.

The final interior geometry of the article to be formed is thus always ensured to correspond with the desired geometry.

This has also been solved by a method defined in the introduction.

Thus, the flexible, hollow curing support embodying the rigid inner shape tool constitutes a rigid male tool with close tolerance dimensions for forming the blank material around the rigid male tool. For curing of the blank material the inner shape tool is removed from the male tool's flexible, hollow curing support, wherein heated air can be introduced into the interior making the curing process more effective than prior art methods. This is cost effective for the production.

Preferably, the step of introducing the flexible, hollow curing support being preceded by the step of clothing the flexible, hollow curing support with a breather fabric and contact material for the curing process.

Thereby is the male tool compensated for the final geometry of the finished article. The breather fabric and the contact material (such as FEP) may have in total a thickness of 15/100 mm.

Suitably, the step of introducing the flexible, hollow curing support being followed by the step of inserting a vacuum bag into the flexible, hollow curing support and sealing the vacuum bag against the close tolerance dividable outer shape tool for seating the flexible, hollow curing support against a forming wall of the close tolerance dividable outer shape tool.

Preferably, the method comprises the further steps of: providing sealing means for sealing the interior of the flexible, hollow curing support; and depressurizing the interior of the flexible, hollow curing support such that the flexible, hollow curing support collapses for withdrawal of it from the finished hollow plastic article.

In such way a tool (the flexible, hollow curing support) is achieved which can be used in the production of an hollow plastic article having openings, through which the tool can be removed and re-used, with an exit area smaller than the cross-sectional area of the tool.

BRIEF DESCRIPTION OF THE DRAWINGS

The present invention will now be described by way of example with reference to the accompanying schematic drawings of which:

FIGS. 1a-1i illustrate a tool assembly according to a first embodiment and a procedure for manufacturing an hollow composite article;

DETAILED DESCRIPTION OF THE PREFERRED EMBODIMENTS

Figure 2A:
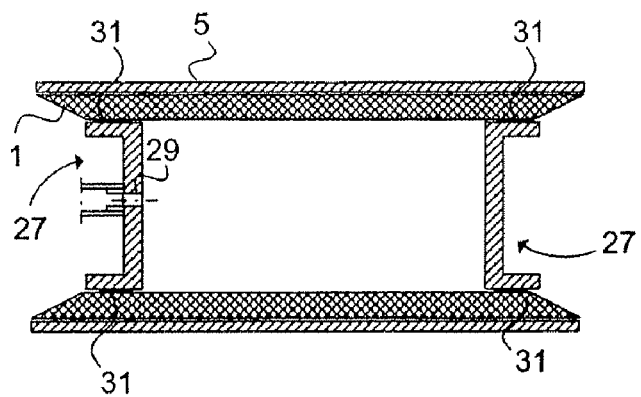
FIG. 2a illustrates a flexible, hollow curing support with the inner shape tool removed according to a second embodiment.

Hereinafter, embodiments of the present invention will be described in detail with reference to the accompanying drawings, wherein for the sake of clarity and understanding of the invention some details of no importance are deleted from the drawings.

Referring to FIG. 1a, a flexible, hollow curing support 1 of a tool assembly 2, is introduced into a close tolerance dividable outer shape tool 3. The flexible, hollow curing support 1 is manufactured in a flexible, hollow curing support mould tool (not shown). This flexible, hollow curing support mould tool is used to build the flexible, hollow curing support 1. It has the same shape as the close tolerance dividable outer shape tool 3, although with slightly different dimensions to account for any breather fabric and approved contact material that is needed externally on the flexible, hollow curing support 1 during the curing procedure of a blank material 5 (such as prepreg material) for manufacturing of an hollow article 7. The step of manufacturing the flexible, hollow curing support 1 in the flexible, hollow curing support mould tool is only needed when the flexible, hollow curing support 1 initially is made or when it needs to be replaced.

The flexible, hollow curing support 1 is shown in a cross section and is elongated. The mid section of the flexible, hollow curing support 1 is wider than the ends, therefore the close tolerance dividable outer shape tool 3 is made in two parts connectable with each other in a completely sealed geometry that enables depressurization. The close tolerance dividable outer shape tool 3's forming wall 11 has the final uncured geometry of the hollow article 7 to be manufactured.

After that the clothed flexible, hollow curing support 1 is placed into the close tolerance dividable outer shape tool 3, an inner vacuum bag 9 (see FIG. 6a) is inserted into the flexible, hollow curing support 1 and sealed against the close tolerance dividable outer shape tool 3. The tool assembly 2 containing the flexible, hollow curing support 1 is depressurized to seat the flexible, hollow curing support 1 against the close tolerance dividable outer shape tool 3's forming wall 11.

In FIG. 1b, an inner shape tool 13, comprising a bag 15 having a connection (not shown here) connectable to a depressurization source (not shown) for providing a vacuum in the bag 15 such that beads 17 therein form a body of firm cohesion providing the inner shape tool 13 rigid, is inserted into the flexible, hollow curing support 1. The beads 17 are small balls of homogeneous plastic of a diameter of 0.1-10 mm, preferably 3-6 mm. After the insertion, the inner shape tool 13 is depressurized by means of the depressurization source. At this point the flexible, hollow curing support 1 together with the inner shape tool 13 will constitute a rigid male tool 19 with close tolerance dimensions.

Referring to FIG. 1c, the close tolerance dividable outer shape tool 3 is disassembled for removing the rigid male tool 19 (the inner shape tool 13 and the flexible, hollow curing support 1) since the mid section of the male tool 19 is wider than it's ends. The distance A is wider than the distance B (see FIG. 4).

Thereafter, the blank material 5 is laid up onto the rigid male tool 19's outer support surface 21 of the flexible, hollow curing support 1, still keeping the depressurized inner shape tool 13 within the flexible, hollow curing support 1.

In FIG. 1d is shown the formed blank material 5 constituting an hollow beam in cross section.

Before curing of the blank material 5, the inner shape tool 13 is removed from the flexible, hollow curing support 1, wherein the blank material 5 will be cured having the flexible, hollow curing support 1 as a support. The inner shape tool 13 is thus arranged to be removable from the flexible, hollow curing support 1 by depressurizing the bag 15. This is shown in FIG. 1e. The bag 15 is later on used in the curing assembly.

The curing procedure takes place in FIG. 1f, wherein is achieved that the curing time will be less than the case with prior art techniques, since heated air T is fed into the flexible, hollow curing support 1 unhindered, i.e. through the same cross section as the end of the hollow article 7. This heated air T will warm up the tool from inside and thereby also the blank material 5 will be warmed up from inside, which is beneficial for the curing process.

The flexible, hollow curing support 1 is stiff enough to serve as a support for the blank material 5 during the curing process and so flexible that it can be collapsed for removal from the final hollow article 7, which will be explained further below.

The flexible, hollow curing support 1 comprises internal reinforcement elements 23 arranged in the corners of the interior for controlling the collapse performance and in FIG. 1g is illustrated a collapse of the flexible, hollow curing support 1 when the blank material 5 has been cured into the final hollow article 7. Both ends of the flexible, hollow curing support 1 is sealed with end caps 27 and the interior of the latter is depressurized so that the walls 25 of the flexible, hollow curing support 1 will be moved towards the longitudinal centre line of the flexible, hollow curing support 1. Two embodiments of this arrangement will be explained below with reference to FIGS. 2a, 2b and 3.

The cross section of the final hollow article 7 is shown in FIG. 1h. After removal of the flexible, hollow curing support 1, the interior is set into atmospheric pressure wherein the flexible, hollow curing support 1 will retake it's original shape, as shown in FIG. 1i, and is clear to be used in the production of a new hollow article 7, starting from FIG. 1a.

Figure 2B:
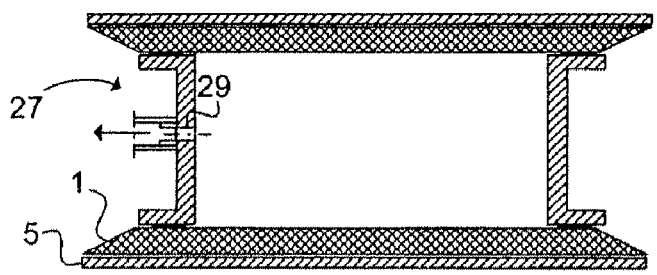
FIG. 2b illustrates the flexible, hollow curing support in FIG. 2a prepared for collapse.

In FIG. 2a is shown more in detail, as an alternative, how the flexible, hollow curing support 1 is used. End caps 27 are installed against the ends of the flexible, hollow curing support 1 after the curing procedure. After curing, a through hole 29 is connected to a vacuum source as being shown in FIG. 2b. The end caps 27 are flexible and made of rubber. They are fit into the flexible, hollow curing support 1 by an adhesive sealant 31. By this arrangement the flexible, hollow curing support 1 is put in order to facilitate debagging.

Figure 3:
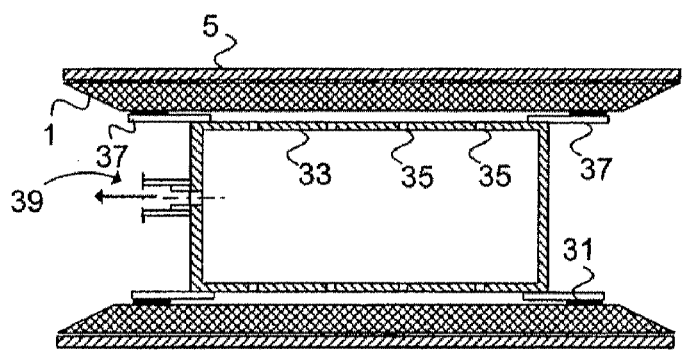
FIG. 3 illustrates a flexible, hollow curing support with the inner shape tool removed and prepared for collapse according to a third embodiment.

In FIG. 3 is shown a further embodiment wherein a perforated pipe 33, comprising holes 35, is inserted into the flexible, hollow curing support 1 after the curing procedure. The perforated pipe 33 is connected to flexible pipe ends 37 which are connected to the flexible, hollow curing support 1's ends. The ends of the perforated pipe 33 are closed, one of which has been provided with a connection piece 39 for connection to a vacuum source (not shown). The perforated pipe 33, which has been sealed against the flexible, hollow curing support 1, is depressurized, wherein the flexible, hollow curing support 1 collapses towards the holes 35 of the perforated pipe 33.

Figure 4:
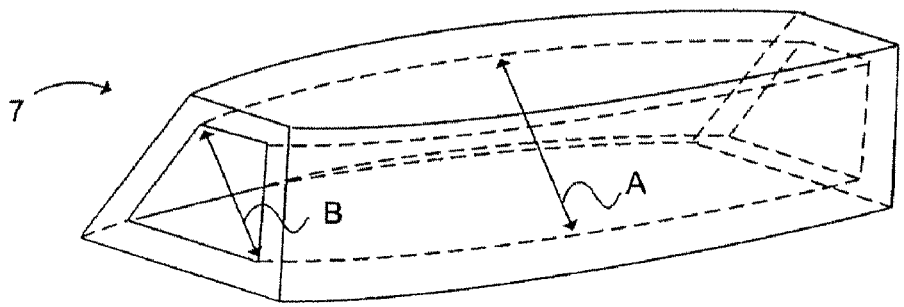
FIGS. 4 and 5 illustrate different types of finished articles suitable to be manufactured by means of the tool assembly.
Figure 5:
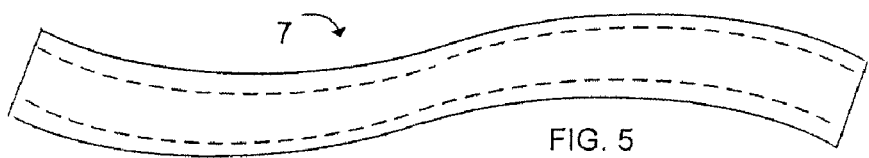

Referring now to FIG. 4, a finished hollow article 7 is shown. In this case it is an hollow rib for air craft production. The rib is wider W in the middle than it is at the ends w. By means of the flexible, hollow curing support 1 is achieved a tool which can be used in the production of an hollow plastic article 7 having openings, through which the tool can be removed and re-used, with an exit area smaller than the widest cross-sectional area of the tool. Referring to FIG. 5 the tool assembly 2 may also be used for manufacturing of an hollow article 7 which is curved but having the same cross sectional area all over.

Figure 6A:
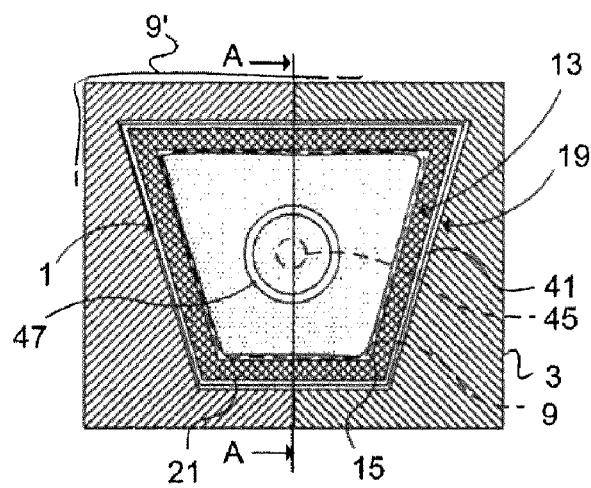
FIGS. 6a and 6b illustrate a tool assembly according to a fourth embodiment.
Figure 6B:
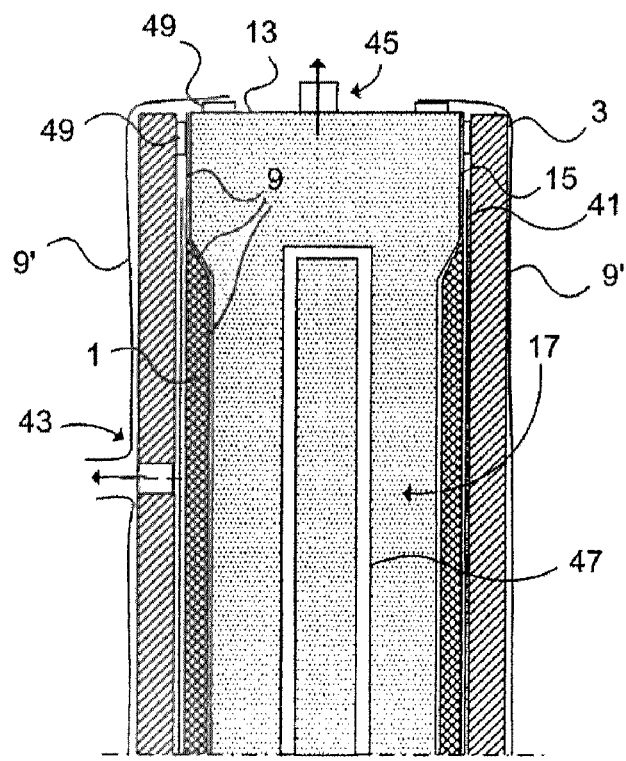

FIGS. 6a and 6b illustrate a tool assembly 2 according to a fourth embodiment. In FIG. 6a is shown a cross section of the tool assembly 2 taken perpendicular to the longitudinal extension of the tool assembly 2. In FIG. 6b is shown a section A-A taken in FIG. 6a.

The male tool 19 includes the inner shape tool 13 comprising a bag 15 having a connection 45 connectable to a depressurization source (not shown) for providing a vacuum in the bag 15 such that beads 17 therein form a body of firm cohesion providing the inner shape tool 13 rigid. The male tool 19 further comprises a flexible, hollow curing support 1 arranged around the rigid inner shape tool 13.

The steps of making the male tool 19 are as follows: Providing the close tolerance dividable outer shape tool 3 by machine finishing a metal work piece into close tolerance as a dividable female tool with regard to the finished article dimensions. The flexible, hollow curing support 1 is firstly clothed onto it's outer support surface 21 with a breather element or permeable fabric 41 and thereafter clothed with FEP film adapted for the curing process further on. The thickness of the breather element and the FEP has been observed when producing the flexible, hollow curing support 1 in a female mould tool (not shown). The clothed flexible, hollow curing support 1 is placed within the close tolerance dividable outer shape tool 3. An inner 9 and outer 9' vacuum bag are arranged such that the flexible, hollow curing support 1, by means of vacuum via a through hole 43 (see FIG. 6b) of the close tolerance dividable outer shape tool 3, is formed tight against the forming wall 11 of the close tolerance dividable outer shape tool 3.

The inner shape tool 13 is placed within the flexible, hollow curing support 1. The inner shape tool 13 comprises the bag 15 containing beads 17 in the form of small plastic balls. The bag 15 comprises the connection point 45 at one end of the bag 15 and vacuum is provided in the bag 15 such that the beads 17 therein form a body of firm cohesion providing the inner shape tool 13 rigid. Furthermore, this embodiment comprises an interior reinforcement in the form of an hollow elastic tube 47 being placed within the bag 15. This elastic tube 47 is pressurized before vacuum is provided in the bag 15 to compact the beads 17 initially.

Thereafter, the flexible, hollow curing support 1 embodying the rigid inner shape tool 13 is removed from the close tolerance dividable outer shape tool 3 and a blank material 5 of curable plastic is formed onto the flexible, hollow curing support 1.

Thereafter, the inner shape tool 13 is removed from the interior of the flexible, hollow curing 1 support by rupturing the vacuum, i.e. by opening the connection point 45.

Subsequently the blank material 5 is cured. The blank material 5 of prepreg is supported by the flexible, hollow curing support 1. Heat is fed unhindered into the interior of the flexible, hollow curing support 1. By this arrangement is achieved that the curing time will be less than the case with prior art techniques, since heated air is fed into the interior of the flexible, hollow curing support 1. This heated air will warm up the flexible, hollow curing support 1 from inside and thereby also the blank material 5 will be warmed up from inside, which is beneficial for the curing process with regard to the time reducing aspect. Also, the cooling time after curing can be speeded up since cold air can be fed into the interior of the tool. The curing time will thus be controllable in a more efficient way compared with known techniques. The production time will be less, which is cost effective.

In FIG. 6b is shown the section A-A taken in FIG. 6a. The outer vacuum bag 9' is sealed against sealant at the ends of the inner shape tool 13 and the inner vacuum bag 9 is sealed against sealant at the ends of the close tolerance dividable outer shape tool 3. The rigid male tool 19 is compensated for the final geometry of the finished hollow article 7. A breather fabric and a contact material (such as air tight FEP) 41 may have in total a thickness of $15/100$ mm and is arranged between the close tolerance dividable outer shape tool 3 and the flexible, hollow curing support 1. This contact layer (or layers) is efficient for removal of the finished hollow article 7 from the flexible, hollow curing support 1.

Figure 7:
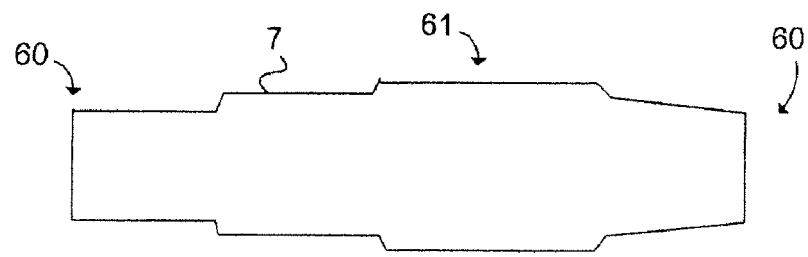
FIG. 7 illustrates a finished article having trapping cross sections.

FIG. 7 illustrates a finished article 7 having trapping cross sections. This embodiment provides that a flexible, hollow support 1 with steps can be used, wherein the ends 60 of the article 7 have smaller cross sections than the middle portion cross section 61.

The present invention is of course not in any way restricted to the preferred embodiments described above, but many possibilities to modifications or combinations of the described embodiments thereof should be apparent to a person with ordinary skill in the art without departing from the basic idea of the invention as defined in the appended claims. The composite plastic can be thermo setting plastic, epoxi resins, thermoplastics, polyester resins, fibreglass reinforced plastics etc. Alternative types of reinforcement in the inner shape tool can be provided. The beads can be of various size and of different material. As an alternative, the tube 47, being placed according to one embodiment within the bag, can be made of rigid material for functioning as a reinforcement means for the flexible, hollow curing support.

The invention claimed is:

1. A tool assembly, comprising:
 a male tool comprising
  a flexible, hollow curing support having a stiffness sufficient to support a blank arranged thereon during curing, and being sufficiently flexible to permit the flexible, hollow curing support to be collapsed for removal from a hollow article formed from the blank, and
  an inner shape tool arranged within the flexible, hollow curing support,
  the inner shape tool comprising a bag having beads arranged therein and a connection connectable to a depressurization source for providing a vacuum in the bag such that the beads form a body of firm cohesion making the inner shape tool rigid, wherein the inner shape tool is configured to be removable from the flexible, hollow curing support by rupturing the vacuum.

2. The tool assembly according to claim 1, further comprising:
 a seal configured to seal an interior of the flexible, hollow curing support.

3. The tool assembly according to claim 1, wherein the flexible, hollow curing support comprises an internal reinforcement element.

4. The tool assembly according to claim 1, further comprising:
 a close tolerance dividable outer shape tool for forming the male tool.

5. The tool assembly according to claim 4, wherein the close tolerance dividable outer shape tool comprises a through bore connectable to a depressurization source for seating the flexible, hollow curing support against a forming wall of the close tolerance dividable outer shape tool.

6. A method for manufacturing a hollow plastic article by a forming and curing processes, the method comprising:
 providing a close tolerance dividable outer shape tool;
 introducing a flexible, hollow curing support within the close tolerance dividable outer shape tool and an inner shape tool within the flexible, hollow curing support, the inner shape tool comprising a bag including beads;
 providing a vacuum in the bag such that the beads therein form a body of firm cohesion providing the inner shape tool rigid;
 removing the flexible, hollow curing support embodying the rigid inner shape tool from the close tolerance dividable outer shape tool;
 forming a blank material of curable plastic onto the flexible, hollow curing support;
 removing the inner shape tool from the interior of the flexible, hollow curing support by rupturing said vacuum; and
 curing the blank material supported by the flexible, hollow curing support by introducing heat into the interior of the flexible, hollow curing support.

7. The method according to claim 6, further comprising:
 clothing the flexible, hollow curing support with a breather fabric and contact material for the curing process prior to introducing the flexible, hollow curing support.

8. The method according to claim 6, further comprising:
 inserting a vacuum bag into the flexible, hollow curing support, and
 sealing the vacuum bag against the close tolerance dividable outer shape tool for seating the flexible, hollow curing support against a forming wall of the close tolerance dividable outer shape tool.

9. The method according to claim 6, further comprising:
 providing a seal configured to seal an interior of the flexible, hollow curing support; and
 depressurizing the interior of the flexible, hollow curing support such that the flexible, hollow curing support collapses for withdrawal of it from the finished hollow plastic article.

* * * * *